US010599526B2

(12) United States Patent
Milvaney et al.

(10) Patent No.: US 10,599,526 B2
(45) Date of Patent: Mar. 24, 2020

(54) AUTO-SAVE OPERATION FOR COLLABORATIVE EDITING OF ELECTRONIC DOCUMENTS (71) Applicant: Microsoft Technology Licensing, LLC, Redmond, WA (US)

(72) Inventors: Douglas Milvaney, Cambridge, MA (US); Barak Cohen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 450 days.

(21) Appl. No.: 14/995,149

(22) Filed: Jan. 13, 2016

(65) Prior Publication Data
US 2017/0199789 A1 Jul. 13, 2017

(51) Int. Cl.
*G06F 11/14* (2006.01)
*H04L 29/06* (2006.01)
(Continued)

(52) U.S. Cl.
CPC ...... *G06F 11/1458* (2013.01); *G06F 11/1451* (2013.01); *G06F 16/2358* (2019.01);
(Continued)

(58) Field of Classification Search
CPC ............. G06F 11/1458; G06F 11/1451; G06F 17/2288; G06F 17/24; G06F 17/30368;
(Continued)

(56) References Cited

U.S. PATENT DOCUMENTS 6,014,681 A 1/2000 Walker et al.
6,067,551 A * 5/2000 Brown .................. G06Q 10/10
(Continued)

FOREIGN PATENT DOCUMENTS

WO 2015153523 A1 10/2015

OTHER PUBLICATIONS

Flinn, Jason, Reducing the Energy Usage of Office Applications, Middleware 2001, LNCS 2218, Springer-Verlag, Berlin, (c) 2001, pp. 252-272.*

(Continued)

*Primary Examiner* — Robert Stevens
(74) *Attorney, Agent, or Firm* — Alleman Hall Creasman & Tuttle LLP (57) ABSTRACT

To manage complexity related to automatically saving an electronic document while the electronic document is collaboratively edited, an end user application running on a local client computer, while participating in collaborative editing of a shared electronic document, is configured to automatically save the electronic document based on both local user activity and external user activity received from a collaboration system on a server computer. The collaboration system implements a save protocol that maintains consistency of the electronic document among the shared storage, remote client computers and the local client computer. The local client computer determines a save interval based on information about external user activity through the server computer, the activity of a user of the end user application on the local client computer. The performance specifications for local and shared storage and the computer network also can be considered.

22 Claims, 7 Drawing Sheets (51) Int. Cl.
  *G06F 16/23* (2019.01)
  *G06F 17/24* (2006.01)
  *G06F 17/22* (2006.01)
  *G06Q 10/10* (2012.01)
(52) U.S. Cl.
  CPC .......... *G06F 17/2288* (2013.01); *G06F 17/24* (2013.01); *G06Q 10/101* (2013.01); *H04L 65/403* (2013.01); *H04L 67/42* (2013.01); *G06F 2201/84* (2013.01); *G06F 2201/86* (2013.01)
(58) Field of Classification Search
  CPC ............ G06F 16/2358; G06F 2201/86; G06F 2201/84; G06Q 10/10; G06Q 10/101; H04L 65/403; H04L 67/42
  USPC ......................................................... 707/618
  See application file for complete search history.

(56) References Cited

U.S. PATENT DOCUMENTS

| | | | |
|---|---|---|---|
| 6,701,454 B1 | 3/2004 | Fischer | |
| 8,209,308 B2 | 6/2012 | Reuben | |
| 8,577,846 B1* | 11/2013 | Axe | G06F 17/243 707/640 |
| 2006/0277482 A1 | 12/2006 | Hoffman et al. | |
| 2010/0070844 A1 | 3/2010 | Aymeloglu | |
| 2011/0012929 A1* | 1/2011 | Grosz | G06F 17/3028 345/661 |
| 2012/0185762 A1 | 7/2012 | Ozer et al. | |
| 2012/0185767 A1 | 7/2012 | Schlegel | |
| 2013/0006919 A1* | 1/2013 | Shaver | G06F 17/24 707/608 |
| 2013/0013875 A1* | 1/2013 | Brown | G06F 1/3203 711/162 |
| 2014/0223377 A1* | 8/2014 | Shaw | G06F 3/0482 715/835 |
| 2015/0200832 A1* | 7/2015 | Kurniady | G06Q 10/101 709/224 |
| 2015/0205463 A1 | 7/2015 | Filev et al. | |
| 2015/0286533 A1 | 10/2015 | Kaufthal | |
| 2017/0024410 A1* | 1/2017 | Pola | G06F 17/30174 |

OTHER PUBLICATIONS

"Core App Behaviors", Published on: Jun. 3, 2014 Available at: https://developer.apple.com/library/mac/documentation/DataManagement/Conceptual/DocBasedAppProgrammingGuideForOSX/StandardBehaviors/StandardBehaviors.html, 6 pages.

"Auto-Save User Input—The Smartest Way?", Retrieved on: Aug. 12, 2015 Available at: http://programmers.stackexchange.com/questions/285251/auto-save-user-input-the-smartest-way, 2 pages.

"Autosave Input Box's to Database during Pause in Typing?", Published on: Aug. 12, 2014 Available at: http://stackoverflow.com/questions/19910843/autosave-input-boxs-to-database-during-pause-in-typing, 2 pages.

"ApS-Ethos Series—Show Me How to Use The Auto Save & Backup Facility", Retrieved on: Aug. 12, 2015 Available at: http://www.brother-usa.com/IndustSewEmb/ToSupport/pdf/How_do_I_use_the_auto_save_and_backup_facility.pdf, 3 pages.

McMahen, Ben, "Auto-save in your Web Application", Published on: Jun. 22, 2013 Available at: http://blog.benmcmahen.com/post/43174272622/auto-save-in-your-web-application, 4 pages.

"OS X Lion: About Auto Save and Versions", Published on: Nov. 22, 2014 Available at: https://support.apple.com/en-us/HT202255, 3 pages.

Kaupanin, Alexander, "Auto-Save User's Input in Your Forms With HTML5 and Sisyphus.js", Published on: Dec. 5, 2011 Available at: http://www.smashingmagazine.com/2011/12/sisyphus-js-client-side-drafts-and-more/, 5 pages.

"International Search Report and Written Opinion Issued in PCT Application No. PCT/US2016/069060", dated Apr. 12, 2017, 10 Pages.

* cited by examiner

AUTO-SAVE OPERATION FOR COLLABORATIVE EDITING OF ELECTRONIC DOCUMENTS

BACKGROUND

The availability of shared storage systems for electronic documents has increased the ability of computer end users to share and collaborate in the creation of a variety of electronic documents. End users can cause documents to be stored in shared storage systems on a computer network, such as the internet. End users can instruct such a shared storage system to allow electronic documents to be shared with other end users of the shared storage system. A shared storage system generally has an access control component in a file system that tracks the access rights users have for each electronic document.

After an electronic document has been shared among two or more end users, the shared storage system manages access to the shared electronic document to ensure consistency of the electronic document, especially in the case of collaborative editing of, i.e., collaborative modifications to, the electronic document. A collaboration system manages collaborative modification by tracking which end users currently are using end user applications on client computers to access the same electronic document. The collaboration system typically is implemented as one or more computer programs executing the server computer, and, in some implementations, may have components executing on the client computers.

An end user application running on a computer, for the purpose of modifying electronic documents, typically is configured to save the electronic document automatically while it is being edited. When the electronic document is shared, such automatic saving during collaborative modification has increased complexity.

SUMMARY

This Summary is provided to introduce a selection of concepts in a simplified form that are further described below in the Detailed Description.

To manage complexity related to automatically saving an electronic document during collaborative editing, an end user application running on a local client computer, while participating in the collaborative editing of the electronic document, is configured to automatically save the electronic document based on both local user activity and external user activity received from a collaboration system. The collaboration system implements a save protocol over a computer network that maintains consistency of the electronic document among the shared storage, remote client computers and the local client computer. This save protocol provides information about the activity of external end users that are editing the electronic document using end user applications on remote client computers. The local client computer determines a save interval based on this information about external user activity and on activity of an end user that is using the end user application on the local client computer to edit the electronic document. The local client computer also can use performance specifications for one or more of the local client computer, the server computer, shared storage and the computer network in setting the save interval.

By determining the save interval using both local user activity and external user activity, an application on a device can be adaptive both to activity of a user editing a document using the application and to activity of other users collaboratively editing the document on other devices. By also considering performance specifications, the application also can be adaptive to the device on which the application is running and/or the shared storage system being accessed, and/or the computer network through which the device connects to the shared storage system. An application that determines a save interval in this way can support collaborative editing across a range of devices, shared storage systems and network connectivity.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
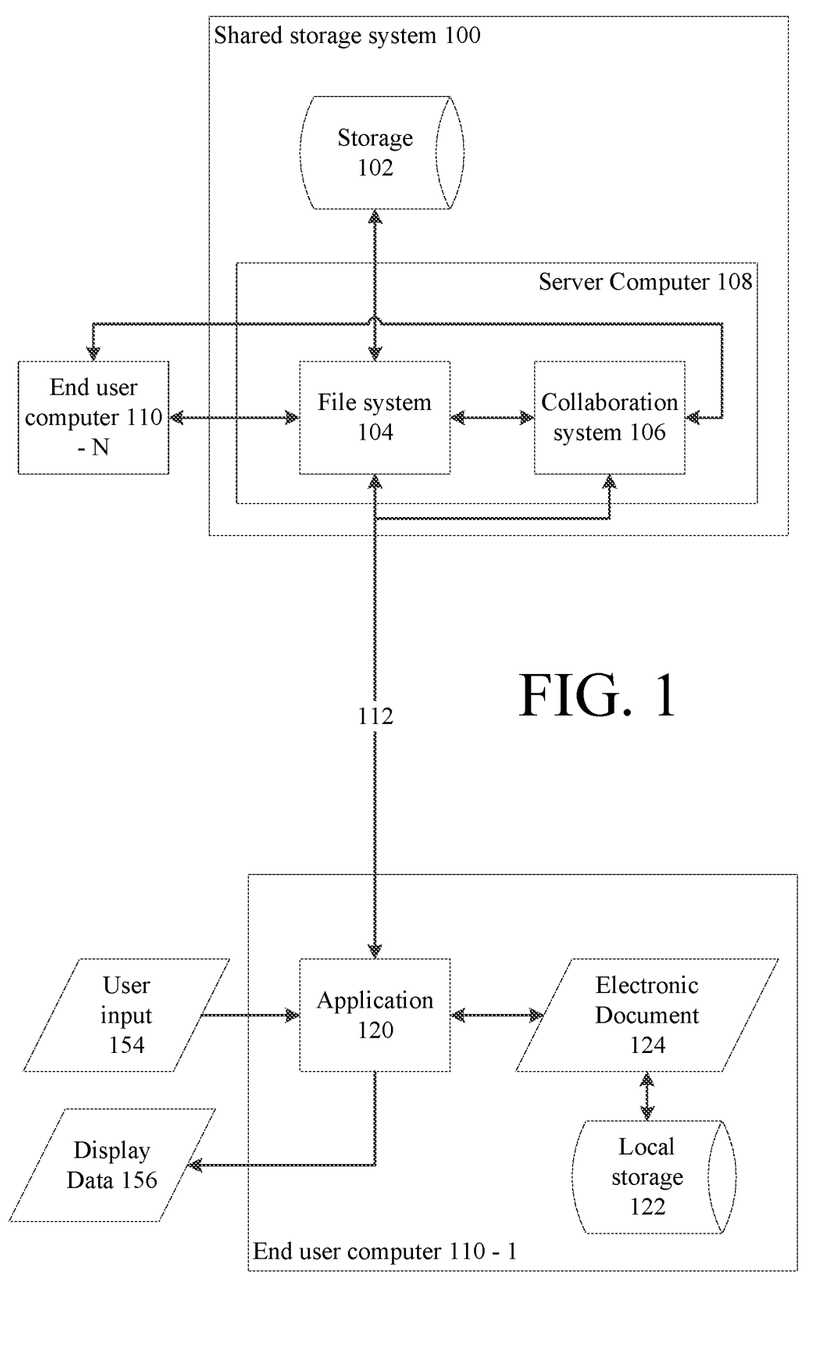
FIG. 1 is a block diagram of an example computer system configured to support collaborative editing of electronic documents through end user applications on multiple client computers.

FIG. 1 is a block diagram of an example computer system configured to support collaborative editing of electronic documents by multiple end users through end user applications on multiple client computers.

A computer system that is configured to support sharing and collaborative modification of electronic documents through multiple end user applications includes a shared storage system 100. The shared storage system 100 generally includes storage 102 in which data is stored in data files accessible through a file system 104 that is part of the shared storage system. The file system configures a server computer 108 to maintain information about each file stored in storage 102. The shared storage system 100 can be implemented using one or more general purpose computers, such as described in connection with FIG. 6, and configured to implement one or more server computers. The shared storage system 100 is responsive to requests over a computer network 112 to access, through the file system 104, files on the storage 102.

Multiple end user computers 110-1 to 110-N, also called client computers herein, are connected to the shared storage system for communication over one or more computer networks 112, such as the internet or a private computer network. An end user computer 110 can be a computer such as described in connection with FIG. 6 and configured as a client computer running one or more applications 120.

Examples of such a computer include, but are not limited to, a tablet computer, a slate computer, a notebook computer, a desktop computer, a virtual desktop computer hosted on a server computer, a handheld computer, and a mobile phone including a computer and applications.

The computer network 112 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

An end user computer 110 includes one or more applications 120. An application is a computer program executed on the end user computer that configures the computer to be responsive to user input 154 to allow an end user to interactively modify an electronic document 124. An electronic document can include any kind of data, such as text, still images, video and audio. The application processes the electronic document, in response to user input through input devices, by selecting and combining portions of data to create the content of the electronic document, by displaying or otherwise presenting display data 156, such as a graphical user interface including the content the electronic document, through output devices (not shown) to the end user, and by storing the electronic document in memory and/or in a data file in local storage of the end user computer.

A variety of kinds of applications can be used on an end user computer. Examples of an application include, but are not limited to, a word processing application, a presentation application, a note taking application, a text editing application, a paint application, an image editing application, a spreadsheet application, a desktop publishing application, a drawing application, a video editing application, and an audio editing application.

An application generates an electronic document that is stored in a data file. Such a data file can be stored in local storage 122 and/or the shared storage system 100. The electronic document, while being modified by an end user on the end user computer, also is temporarily stored in memory on the end user computer. The application also may temporarily store the electronic document in a cache on local storage before committing changes to the electronic document to the data file.

For an electronic document stored in a data file in the shared storage system 100, the file system 104 of the shared storage system includes information indicating a sharing state of the electronic document. Such information can be in the form of access controls indicating which end users are authorized to access the electronic document. The file system also can be configured to be responsive to a query to provide this information to another application, such as application 120 on an end user computer. The shared storage system can provide information to an application on an end user computer about the sharing state of an electronic document, and permit modification to that sharing state, in a number of ways.

If an electronic document is stored in a data file in the shared storage system 100, and the data file is shared, with modification rights, with at least one more end user, then two or more end user applications on two or more client computers may access and attempt to modify the electronic document. To handle such a condition, the shared storage system can include a collaboration system 106. The collaboration system 106 is a computer program that configures the server computer to manage contemporaneous access to shared electronic documents in the shared storage system 100. The collaboration system 106 is configured to store information about end user applications, and associated end users, that currently are accessing the electronic document.

Using the information about end user applications and end users currently accessing an electronic document, the collaboration system can implement any of a number of different techniques for coordinating access to the electronic document to ensure consistency of the electronic document. For example, the collaboration system can prevent one end user application from causing modifications to be written to a data file for an electronic document while another the data file is open for writing by another end user application. As another example, the collaboration system can interactively merge changes to the electronic document as such changes are being made collaboratively through multiple end user applications. In such a case, as an example, the collaboration system can merge changes received from end user computers in memory local to the collaboration system, and then can transmit a modified version of the electronic document to each end user computer with an application currently accessing the document.

Figure 2:
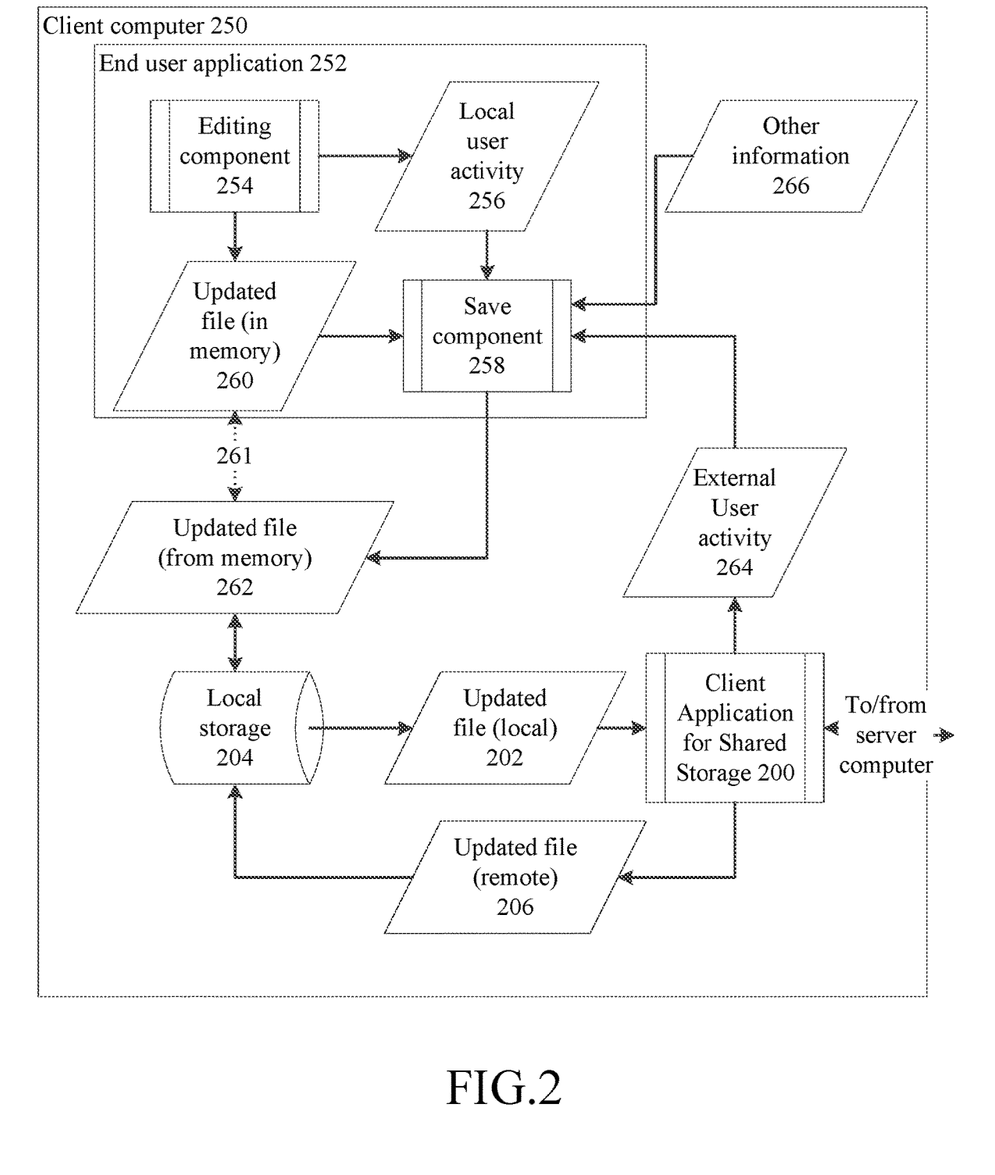
FIG. 2 is a data flow diagram of an example client computer configured to automatically save collaboratively edited documents.

In one implementation of the latter example, a save protocol is implemented among the server computer and the client computers. Referring now to FIG. 2, using a save protocol, the client computers 250 include a client application 200 for shared storage that periodically transmits an updated file 202 of the electronic document from the local storage 204 to the server computer. The server computer then transmits a copy of the electronic document received from one client computer to the other client computers that are using that electronic document. The client application 200 for the shared storage receives an updated file 206 of the electronic document from the server computer, and then updates its copy in local storage 204.

Also shown in FIG. 2, the client computer 250 includes an end user application 252 for editing an electronic document. In the example illustrated in FIG. 2, the end user application has at least two components running for each electronic document being edited, an editing component 254 and a save component 258. The components can be any asynchronous processes managed by the operating system running the application. As an example, these components can be implemented as two asynchronous threads. An editing component 254 responds to user input to edit an electronic document in memory, illustrated as the updated file (in memory) 260. Information about the editing activity (local user activity 256) is provided to a save component 258. The save component periodically saves the updated electronic document from the memory into the local storage 204 as indicated by the dashed arrow 261 and updated file (from memory) 262. In some implementations, the save component may save the updated file first to a cache file in local storage to ensure data integrity, and then update the actual file in local storage.

The save component has generally two operations: the first is for saving the current state of the document; the second is for setting a timing interval at which the next save operation will occur for the document. After determining the timing interval, in one implementation, the save component sets an interrupt with the client computer; in response to the interrupt, the save component saves the electronic document to local storage and then computes the next time interval and sets the interrupt again.

To compute an interval of time at which automatic save operations occur for an electronic document being edited by the end user application 254, the save component 258 uses the information about the local user activity 256 and information about external user activity 264. The save component also can use other information 266 about the local client computer, the shared storage system and/or the network connection to the shared storage system. The save interval can be dynamically computed so that, as a user's behavior changes while interacting with the end user application, the interval of time between automatic save operations also changes. The client application 200 for the shared storage also interacts with the local storage 204 to periodically implement the save protocol with the shared storage system, which sends the updated file to the server computer and receives updates to the file from the server computer received from other remote client computers.

The information about the local user activity, the external user activity, the local client computer, the shared storage system, and the network connection, can include several parameters which can influence the save interval determined by the save component. These parameters are inputs to the process that computes the save interval to determine when the next automatic save operation should occur.

For example, the information about the local user activity with respect to an electronic document can include, but is not limited to, one or more of user idle time with respect to the electronic document since the last save, number of keystrokes with respect to the electronic document since the last save, navigational inputs with respect to the electronic document since the last save, changes in focus into or out of the application, explicit save operations for the electronic document performed at the direction of the user, closing the electronic document, closing the application, size (amount of data) for any changes in the content of the electronic document, or idle time between changes in the electronic document.

The information about external user activity with respect to an electronic document can include, but is not limited to, one or more of a time at which other authors' changes to the electronic document are made, or other indication of a frequency of other authors' changes to the electronic document, size of other authors' changes to the electronic document, or a number of other authors that are editing the electronic document.

The information about the local client computer can include, but is not limited to, one or more of available memory, available processor, processor speed, or local storage bandwidth.

The information about the shared storage system can include, but is not limited to, one or more of various storage performance statistics, such as storage capacity, storage bandwidth, or average save times.

The information about the network connection can include, but is not limited to, one or more of current average network transmission rates, any data transmission limits, such as for cellular data connections which have limited data transmission, or data transmission costs.

Figure 3:
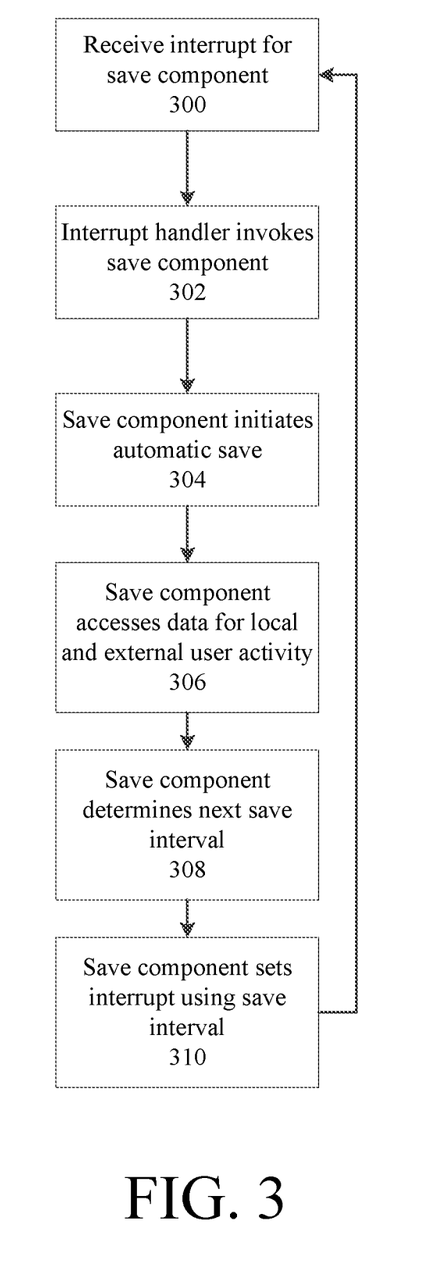
FIG. 3 is a flow chart describing an example implementation of an operation for automatically saving an electronic document to local storage of a client computer.

Turning now to FIG. 3, a flowchart describing an example implementation of the operation for the save component 258 (FIG. 2) will now be described. This operation is described in the context of a single file being edited by a single edit component and a single associated save component of an application. A separate save component can be instantiated for each file that is being edited when multiple files are open for editing in one or more applications. Thus, each file can be automatically saved based on the local user activity and external user activity pertinent to that file.

An interrupt handler for a save component interrupt receives 300 a save component interrupt from the processor. The interrupt handler invokes 302 the save component. The save component initiates 304 an auto-save operation on the file being editing by the edit component. The save component accesses 306 data from which it computes the next save interval. This data includes at least the information about the local user activity and the external user activity. This data also can include information about the local client computer, shared storage system and network connection. The save component determines 308 the next save interval. An example implementation of a computation for determining the next save interval is described below in connection with FIG. 5. The save component then sets 310 a save component interrupt with the processor based on the computed interval. This process repeats when the save component interrupt is received 300 again.

Figure 4A:
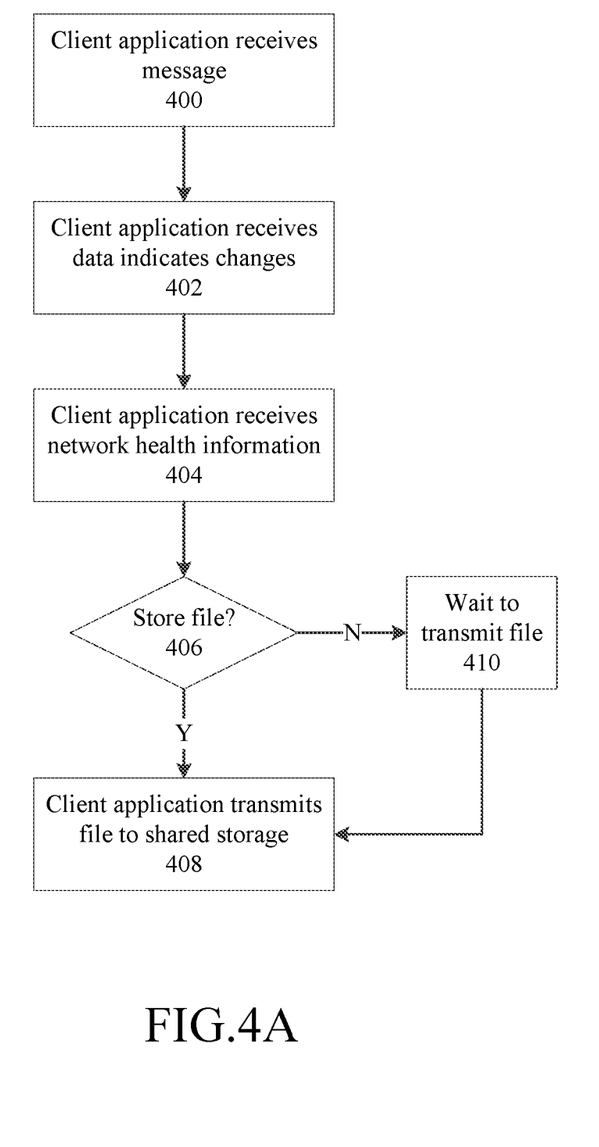
FIG. 4A is a flow chart describing an example implementation of an operation of a client application for a shared storage system for saving updates to an electronic document to a shared storage system.

Turning now to FIG. 4A, the client application 200 (FIG. 2) for the shared storage system is responsive to saving of a file through the auto-save process performed by the save component to, in turn, save the file on the shared storage system. If the file is currently open for editing on one or more remote client computers, this client application on the local client computer also receives updates to the file through the shared storage system, and in turn, determines an order in which to apply the updates to the file, as described in FIG. 4B.

In FIG. 4A, the client application receives 400 a message from the local file system indicating that a shared file has been updated. The client application also can receive 402 or determine data indicating an amount of data that has been changed. The client application also can receive 404 data relating to the network connection, such as the current available bandwidth over the connection. The client application then determines 406 whether to transmit the changes to the data file to the shared storage system, based on the amount of data that has changed, and optionally based on the data relating to the network connection. If the client application determines that the data file should be stored on the shared storage system, then the client application transmits 408 the data file over the computer network to the shared storage system. If the client application determines that storage of the data file can wait, then the client application waits 410 a period of time before transmitting the data file to the shared storage system.

Figure 4B:
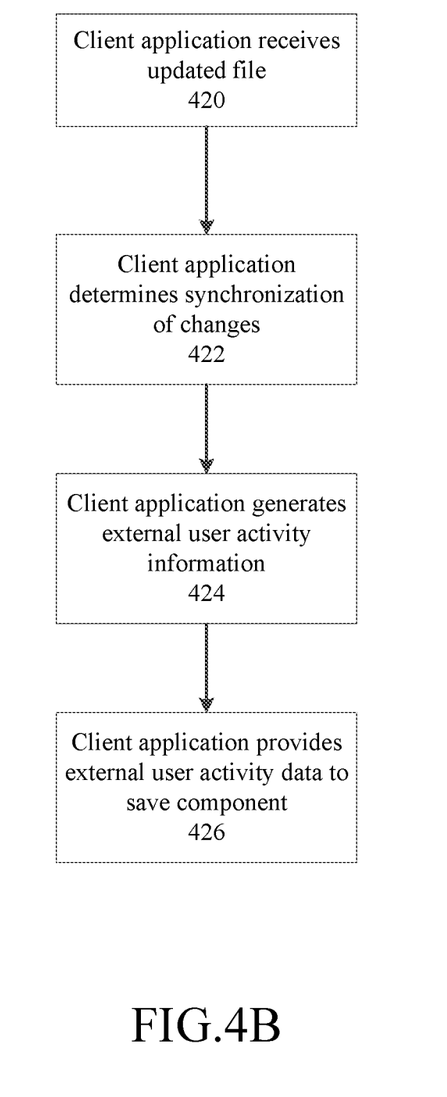
FIG. 4B is a flow chart describing an example implementation of an operation of a client application for a shared storage system for receiving updates to an electronic document from a shared storage system.

In FIG. 4B, the client application (200 in FIG. 2) for the shared storage system receives 420 an updated file over the computer network from the shared storage system. The client application determines 422 how to synchronize the updates to the file with the local copy of the file. The client application also generates 424 information about the external user activity, and provides 426 this information to the save component associated with the updated file. The information provided by the client application to the save component can include, for example, times at which other authors' changes are made, or other indication of a frequency of other authors' changes, size of other authors' changes, and a number of other authors. The save component can compute some of the information about the external user activity from the information provided by the client application or by inspecting information about the updated file in the file system.

Figure 5:
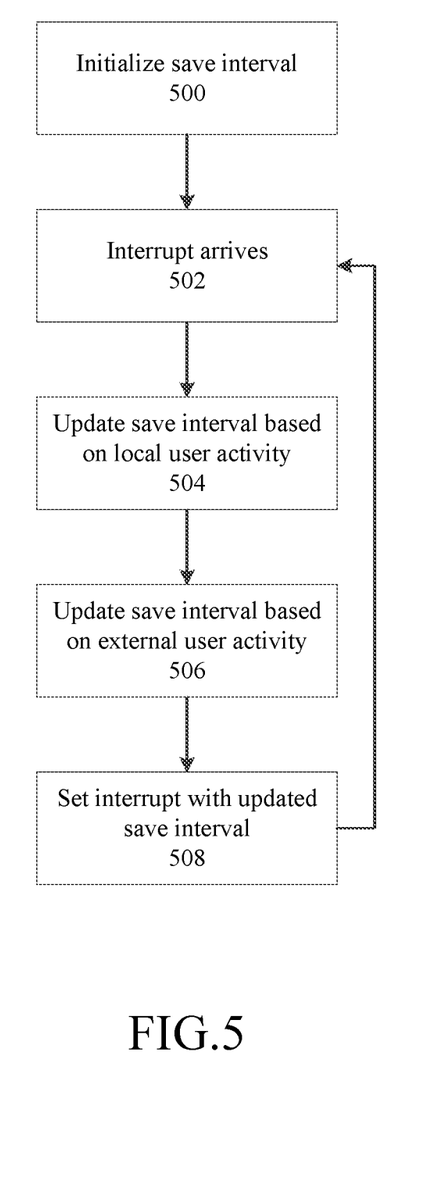
FIG. 5 is a flow chart describing an example implementation of an operation for computing a save interval.

Turning now to FIG. 5, an example implementation of a computation of a save interval will now be described. A wide variety of implementations are possible. In this example implementation, an initial save interval is set and then gradually adjusted over time based on the information received for each auto-save interval.

Thus, in FIG. 5, the save component initializes 500 a save interval. This initial save interval can be computed in a number of ways. For example, the information about the local client computer, such as available memory, available processor, processor speed, and local storage bandwidth, and information about the shared storage system, such as storage performance statistics, can be factors in setting the initial save interval. After the arrival of the interrupt based on that save interval, as indicated at 502, the save component updates the initial save interval based on the data available to the save component. Similarly, an explicit save operation in response to a user input can override the interrupt, and cause the save interval to be updated. The save component updates the save interval based on at least local user activity and external user activity. For example, based on local user activity, the save interval can be increased or decreased 504. For example, the save interval is decreased (made shorter) if local user activity is high, such as indicated by idle time, keystrokes, or amount of changed data. The save interval can be increased (made longer) if local user activity is low. However, based on external user activity, according to information received from the client application for the shared storage, the save interval also can be increased or decreased 506. For example, the save interval can be decreased (made shorter) if the client application indicates a lot of activity by other users through the save protocol, even if the local user activity is minimal. In general, given the save interval, the level of local user activity and the level of external user activity, the interval can be increased or decreased so as to meet a target rate of overall user activity in the save interval. The save component then uses the save interval to set 508 the next interrupt.

By taking advantage of information about external user activity when computing a save interval for an automatic save operation, an application provides timely updates to all users of a collaboratively edited document. The application also is adaptive both to activity of a user editing a document using the application and to activity of other users collaboratively editing the document on other devices. By also considering performance specifications, the application also can be adaptive to the device on which the application is running and/or the shared storage system being accessed, and/or the computer network through which the device connects to the shared storage system. An application that determines a save interval in this way can support collaborative editing across a range of devices, shared storage systems and network connectivity. The client application for the shared storage system, by using the network connection information to determine when to transmit updated files to the shared storage system, also allows bandwidth utilization on the network to be balanced against the timely delivery of updates from the automatic save operation.

Figure 6:
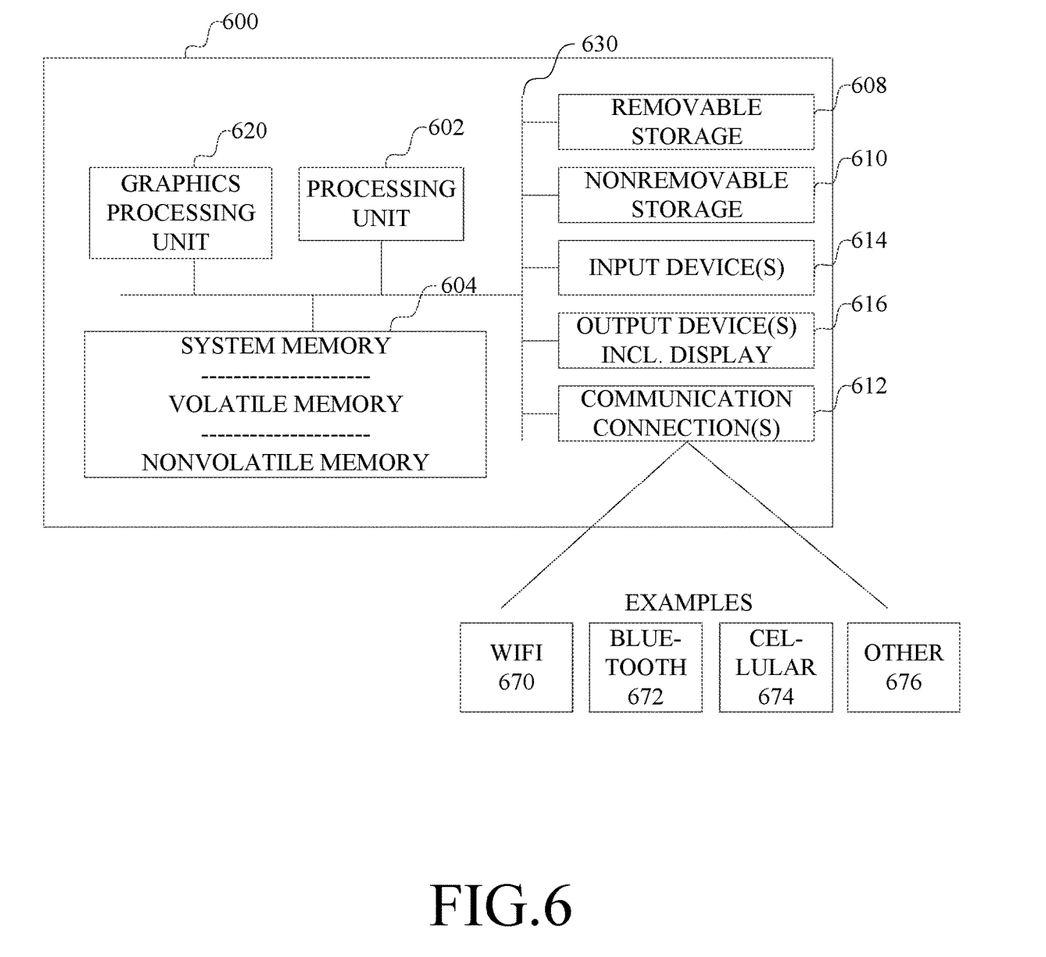
FIG. 6 is a block diagram of an example computer.

Having now described an example implementation, FIG. 6 illustrates an example of a computer with which such techniques can be implemented to provide a peer computer or index in a peer-to-peer network. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 6, a computer 600 includes at least one processing unit 602 and memory 604. The computer can have multiple processing units 602 and multiple devices implementing the memory 604. A processing unit 602 can include one or more processing cores (not shown) that operate independently of each other. Additional co-processing units also can be present in the computer. The memory 604 may include volatile devices (such as dynamic random access memory (DRAM) or other random access memory device), and nonvolatile devices (such as a read-only memory, flash memory, and the like) or some combination of the two. Other storage, such as dedicated memory or registers, also can be present in the one or more processors. The computer 600 can include additional storage, such as storage devices (whether removable or non-removable) including, but not limited to, magnetically-recorded or optically-recorded disks or tape. Such additional storage is illustrated in FIG. 6 by removable storage device 608 and non-removable storage device 610. The various components in FIG. 6 are generally interconnected by an interconnection mechanism, such as one or more buses 630.

A computer storage medium is any medium in which data can be stored in and retrieved from addressable physical storage locations by the computer. Computer storage media includes volatile and nonvolatile memory, and removable and non-removable storage devices. Memory 604, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 600 may also include communications connection(s) 612 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 612 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media.

The computer 600 may have various input device(s) 614 such as a pointer device, keyboard, touch-based input device, pen, camera, microphone, sensors, such as accelerometers, thermometers, light sensors and the like, and so on. The computer 600 may have various output device(s) 616 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 610, communication connections 612, output devices 616 and input devices 614 can be integrated within a housing with the rest of the computer, or can be connected through various input/output interface devices on the computer, in which case the reference numbers 610, 612, 614 and 616 can indicate either the interface for connection to a device or the device itself as the case may be.

A computer generally includes an operating system, which is a computer program that manages access to the various resources of the computer by applications. There may be multiple applications. The various resources include the memory, storage, input devices and output devices, such as display devices and input devices as shown in FIG. 6.

The various modules and data structures of FIGS. 1 and 2, the flowcharts of FIGS. 3-5, as well as any operating system, file system and applications on a computer in FIG. 6, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer, configured as a local client computer, includes a save component in an application that, when executed by the local client computer, configures the local client computer to, periodically, during collaborative editing of the electronic document though the application receive data indicative of local user activity from the local client computer indicative of user interaction with the application with respect to the electronic document. The save component also receives data indicative of external user activity with respect to external user interaction with respect to the electronic document, based on at least operation of the save protocol with the server computer. The save component determines an interval based on the data indicative of the local user activity and the data indicative of the external user activity. Based on at least the determined interval, the save component automatically saves any content of the electronic document edited in the application.

In another aspect, an article of manufacture includes a computer storage medium and computer program instructions for an application incorporating such a save component.

In another aspect, a computer-implemented process performed by a local client computer, to automatically save an electronic document during collaborative editing of the electronic document using an end user application, includes, periodically during collaborative editing of the electronic document though the application, receiving data indicative of local user activity from the local client computer indicative of user interaction with the application with respect to the electronic document. Data indicative of external user activity with respect to external user interaction with respect to the electronic document, based on at least operation of a save protocol with a server computer, also is received. An interval is determined based on at least the data indicative of the local user activity and the data indicative of the external user activity. Based on the determined interval, the electronic document is automatically saved.

In another aspect, a computer system for supporting collaborative editing of a document includes a server computer including shared storage for electronic documents over a computer network. One or more remote client computers are connected to the server computer over one or more computer networks. A local client computer with one or more applications to support collaborative editing of an electronic document stored in the shared storage also is connected to the server computer over a computer network. The server computer is configured to manage the collaborative editing of the electronic document by an application on the local client computer and an application on the remote client computer by implementing a save protocol through the server computer. The local client computer, includes a save component in the application that, when executed by the local client computer, configures the local client computer to periodically, during collaborative editing of the electronic document though the application, receive data indicative of local user activity from the local client computer indicative of user interaction with the application with respect to the electronic document. The save component also receives data indicative of external user activity with respect to external user interaction with respect to the electronic document, based on at least operation of the save protocol with the server computer. The save component determines an interval based on the data indicative of the local user activity and the data indicative of the external user activity. Based on at least the determined interval, the save component automatically saves any content of the electronic document edited in the application.

In another aspect, an application on a computer includes a save component that includes means for receiving data indicative of local user activity with respect to an electronic document and means for receiving data indicative of external user activity with respect to the electronic document. The save component includes means for automatically saving the electronic document based on a save interval based on at least the local user activity and the external user activity.

In another aspect, automatic saving of an electronic document includes receiving data indicative of local user activity with respect to the electronic document and receiving data indicative of external user activity with respect to the electronic document. The electronic document is periodically saved based on a save interval periodically determined based on at least the local user activity and the external user activity.

In any of the foregoing aspects, the data indicative of the local user activity can include data indicative of idle time with respect to the electronic document in the application.

In any of the foregoing aspects, the data indicative of the local user activity can include data indicative an amount of changes to the electronic document during a period of time.

In any of the foregoing aspects, the data indicative of the external user activity can include data based on changes to the electronic document from a remote client computer.

In any of the foregoing aspects, to determine the interval, a decreased interval is computed in response to frequent changes to the electronic document from remote client computers during a period of idle time with respect to the electronic document on the local client computer.

In any of the foregoing aspects, to determine the interval, an initial interval is computed according to performance specifications of the local client computer.

In any of the foregoing aspects, to determine the interval, an initial interval is updated according to information about changes to the electronic document from the remote client computer and local user activity with respect to the electronic document.

In any of the foregoing aspects, the save interval further can be based on information about any one or more of a local client computer, shared storage system and/or network connection between the local client computer and the shared storage system.

In any of the foregoing aspects, the save component is an asynchronous thread of the application. The application can have a save component for each electronic document being edited in the application. The application can have an editing component for each electronic document being edited in the application.

In any of the foregoing aspects, an interrupt can be set in the computer based on the save interval, and, in response to the interrupt, the save interval can be recomputed.

In any of the foregoing aspects, a client application for the shared storage system can transmit an updated file from the client computer to the shared storage system based on information about a network connection between the client computer and the shared storage system.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer, configured as a local client computer, for use in a computer system comprising a server computer comprising shared storage for electronic documents, and a remote client computer, the local client computer and the remote client computer connected to the server computer over a computer network, the remote client computer configured to support collaborative editing of an electronic document stored in the shared storage, the server computer configured to manage the collaborative editing of the electronic document by an application on the local client computer and the remote client computer by implementing a save protocol with the server computer, the local client computer comprising:

a save component in the application that, when executed by the local client computer, configures the local client computer to, during collaborative editing of the electronic document though the application and for each save operation in a series of successively performed automatic save operations:

receive data indicative of local user activity from the local client computer indicative of user interaction with the application with respect to the electronic document;

receive data indicative of external user activity with respect to external user interaction with respect to the electronic document, based on at least operation of the save protocol with the server computer;

responsive to both the local and external user activity, dynamically compute an interval for a next save operation in the series based on at least the data indicative of the local user activity and the data indicative of the external user activity to meet a target rate of combined local and external user activity in the interval; and based on at least the computed interval, set a time for performance of the next save operation in the series of successively performed automatic save operations performed on the electronic document.

2. The computer of claim 1, wherein the data indicative of the local user activity includes data indicative of idle time with respect to the electronic document in the application.

3. The computer of claim 1, wherein the data indicative of the local user activity includes data indicative of an amount of changes to the electronic document during a period of time.

4. The computer of claim 1, wherein the data indicative of the external user activity comprises data based on changes to the electronic document from a remote client computer.

5. The computer of claim 1, wherein to compute the interval, the save component computes a decreased interval in response to frequent changes to the electronic document from remote client computers during a period of idle time with respect to the electronic document on the local client computer.

6. The computer of claim 1, wherein to determine the interval, the save component computes an initial interval according to performance specifications of the local client computer.

7. The computer of claim 1, wherein to determine the interval, the save component updates the initial interval according to information about changes to the electronic document from the remote client computer and local user activity with respect to the electronic document.

8. The computer of claim 1, wherein to compute the interval, the save component computes a shorter interval in response to changes that occur more frequently to the electronic document including both local and external user activity, and a longer interval in response to changes that occur less frequently to the electronic document including both local and external user activity.

9. The computer of claim 1, further comprising a client application of the shared storage system, operative in response to a local save operation by the save component, to schedule transmission of the saved electronic document to the shared storage system.

10. An article of manufacture, comprising:
a computer storage medium;
computer program instructions for an application stored on the computer storage medium which, when executed by a computer, instruct the computer to, periodically, during collaborative editing of an electronic document though the application:
  receive data indicative of local user activity from the computer indicative of user interaction with the application with respect to the electronic document, the data indicative of local user activity including at least data about changes to the electronic document by a local user, the data about changes including at least one of a frequency or an amount of changes to the electronic document by the local user;
  receive data indicative of external user activity with respect to external user interaction with respect to the electronic document, based on at least activity information received through a save protocol executed by the computer in conjunction with a server computer, the data indicative of external user activity including at least data about changes to the electronic document by an external user, the data about changes including at least one of a frequency or an amount of changes to the electronic document by the external user;
  responsive to both the local and external user activity, dynamically compute an interval based on at least the data indicative of the local user activity and the data indicative of the external user activity to meet a target rate of combined local and external user activity in the interval; and
  based on at least the computed interval, automatically save the electronic document.

11. The article of manufacture of claim 10, wherein data indicative of the local user activity includes data indicative of idle time with respect to the electronic document in the application.

12. The article of manufacture of claim 10, wherein data indicative of the local user activity includes data indicative of an amount of changes to the electronic document during a period of time.

13. The article of manufacture of claim 10, wherein the data indicative of external user activity comprises data based on changes to the electronic document from a remote client computer.

14. The article of manufacture of claim 10, wherein to determine the interval, the save component computes a decreased interval in response to frequent changes to the electronic document from remote client computers during a period of idle time with respect to the electronic document on the local client computer.

15. The article of manufacture of claim 10, wherein to determine the interval, the save component computes an initial interval according to performance specifications of the local client computer.

16. The article of manufacture of claim 10, wherein to determine the interval, the save component updates the initial interval according to information about changes to the electronic document from the remote client computer and data indicating local user activity with respect to the electronic document.

17. A computer-implemented process performed by a local client computer, to automatically save an electronic document during collaborative editing of the electronic document using an end user application, comprising, for each save operation in a series of successively performed automatic save operations occurring during collaborative editing of the electronic document though the end user application:
  receiving data indicative of local user activity from the local client computer indicative of user interaction with the end user application with respect to the electronic document;
  receiving data indicative of external user activity with respect to external user interaction with respect to the electronic document, based on at least operation of a save protocol with a server computer;
  responsive to both the local and external user activity, dynamically computing an interval for a next save operation in the series based on at least the data indicative of the local user activity and the data indicative of the external user activity to meet a target rate of combined local and external user activity in the interval; and
  based on at least the computed interval, set a time for performance of the next save operation in the series of successively performed automatic save operations performed on the electronic document.

18. The computer-implemented process of claim 17, wherein data indicative of the local user activity includes data indicative of an amount of changes to the electronic document during a period of time.

19. The computer-implemented process of claim 17, wherein the data indicative of the external user activity comprises instructions to update a collaboratively edited document based on changes to the electronic document from a remote client computer.

20. The computer-implemented process of claim 17, wherein to determine the interval, the save component computes a decreased interval in response to frequent changes to the electronic document from remote client computers during a period of idle time with respect to the electronic document on the local client computer.

21. The computer-implemented process of claim 17, wherein to determine the interval, the save component computes an initial interval according to performance specifications of the local client computer.

22. The computer-implemented process of claim 17, wherein to determine the interval, the save component updates the initial interval according to information about changes to the electronic document from the remote client computer and local user activity with respect to the electronic document.

* * * * *